(12) United States Patent
Kim

(10) Patent No.: US 7,258,034 B2
(45) Date of Patent: Aug. 21, 2007

(54) RACK BAR OF POWER STEERING GEARBOX

(75) Inventor: Dae-Jung Kim, Kyunggi-do (KR)

(73) Assignee: Hyundai Mobis Co., Ltd., Yongin-shi (KR)

(*) Notice: Subject to any disclaimer, the term of this patent is extended or adjusted under 35 U.S.C. 154(b) by 176 days.

(21) Appl. No.: 10/330,191

(22) Filed: Dec. 30, 2002

(65) Prior Publication Data

US 2004/0031342 A1   Feb. 19, 2004

(30) Foreign Application Priority Data

Aug. 13, 2002   (KR) ............... 10-2002-0047766

(51) Int. Cl.
*B62D 5/22* (2006.01)

(52) U.S. Cl. ............... 74/388 PS; 74/422; 180/441; 91/399; 91/401

(58) Field of Classification Search ............ 74/388 PS; 180/428, 441; 91/399, 401
See application file for complete search history.

(56) References Cited

U.S. PATENT DOCUMENTS

| | | | | | |
|---|---|---|---|---|---|
| 928,100 | A | * | 7/1909 | Berry | 91/399 |
| 2,569,504 | A | * | 10/1951 | Thierry | 91/399 |
| 2,807,081 | A | * | 9/1957 | Black | 29/252 |
| 2,997,849 | A | * | 8/1961 | Shimanckas | 60/572 |
| 3,832,852 | A | * | 9/1974 | Schmucker | 60/546 |
| 4,622,884 | A | * | 11/1986 | Buchl | 91/445 |
| 4,828,068 | A | * | 5/1989 | Wendler et al. | 180/428 |
| 5,205,372 | A | * | 4/1993 | Kotake et al. | 180/441 |
| 5,868,216 | A | * | 2/1999 | Eberhart | 180/428 |
| 5,878,992 | A | * | 3/1999 | Edwards et al. | 251/122 |
| 6,138,789 | A | * | 10/2000 | Eberhart et al. | 180/428 |

FOREIGN PATENT DOCUMENTS

| | | | | |
|---|---|---|---|---|
| DE | 40 38 451 | A | * | 6/1991 |
| DE | 42 21 459 | A | * | 1/1994 |
| GB | 1 444 631 | | * | 8/1976 |
| JP | 60-122277 | | * | 8/1985 |
| JP | 6-219297 | | * | 8/1994 |
| KR | 20000016760 | | | 9/2000 |
| KR | 20010027557 | | | 4/2001 |

OTHER PUBLICATIONS

English Language Abstract of DE 4221459.

* cited by examiner

*Primary Examiner*—William C Joyce
(74) *Attorney, Agent, or Firm*—Greenblum & Bernstein, P.L.C.

(57) ABSTRACT

Disclosed is an apparatus for protecting impact to a rack bar of a power steering gearbox comprising an oil pressure cylinder, to which oil which has passed through an oil pressure pump and a rotary valve is supplied through a left port or right port, a rack bar disposed in the oil pressure cylinder and horizontally reciprocating, a piston fixed at the middle of the rack bar, a first lack bush and a second lack bush disposed at both ends of the cylinder, in which the piston moves, to close the cylinder, and bypass holes with a downward convex shape disposed at both ends of the cylinder adjacent to the first and second rack bushes, in which a part of oil pressure is released immediately before a piston of the rack bar moving by the power of oil pressure reaches a rack bush, whereby impact to the cylinder or noise is not generated.

11 Claims, 3 Drawing Sheets

[FIG. 1] CONVENTIONAL ART
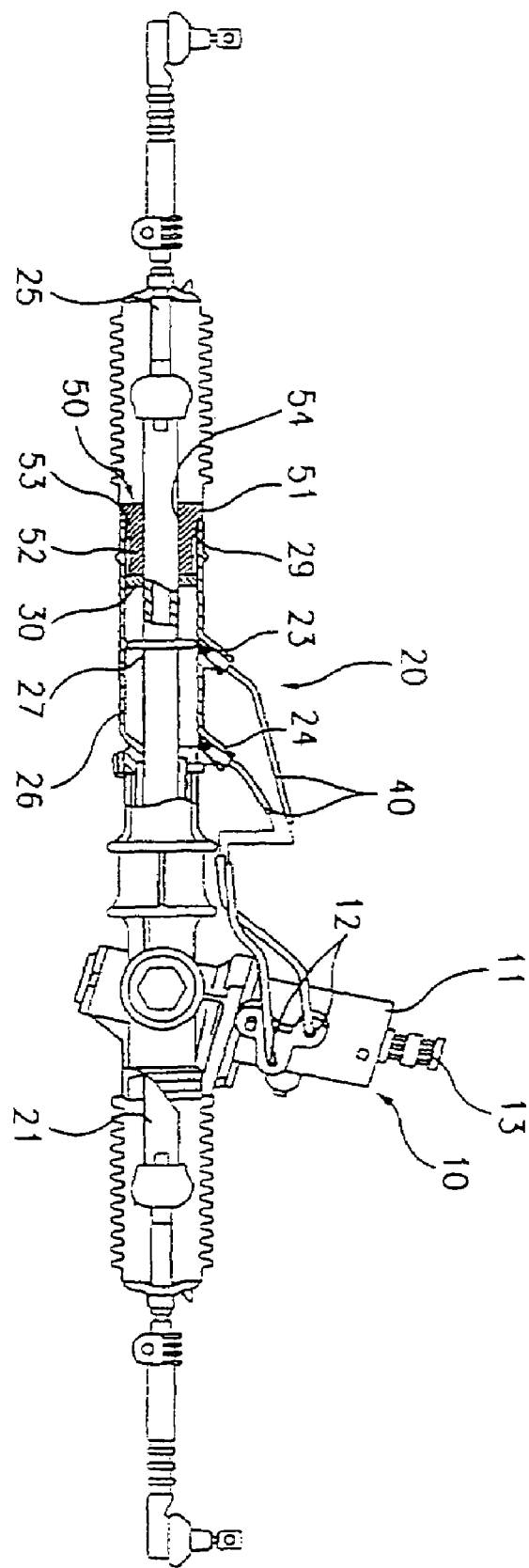

[FIG. 2]
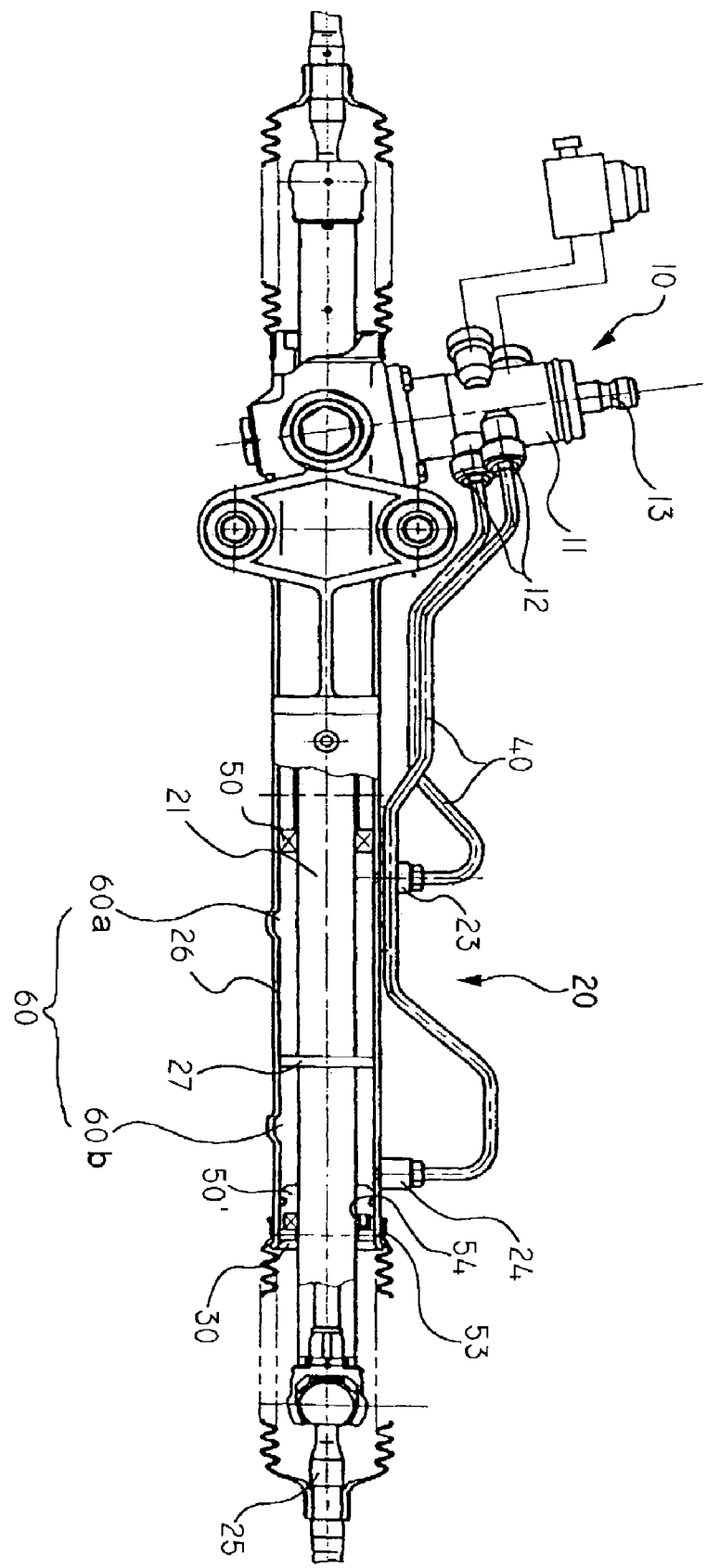

[FIG. 3]
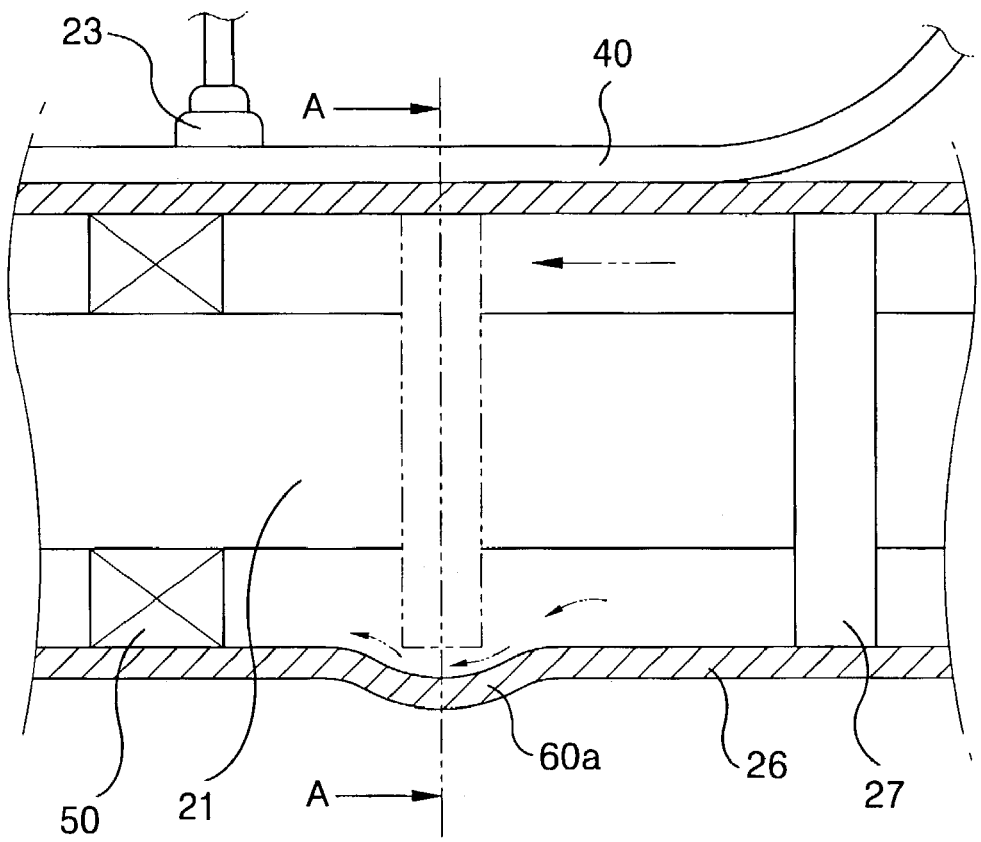
[FIG. 4]
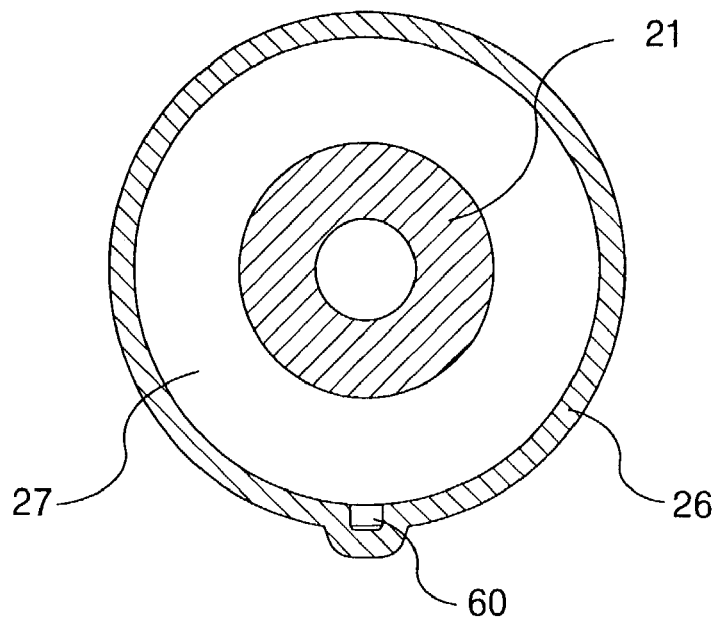

RACK BAR OF POWER STEERING GEARBOX

BACKGROUND OF THE INVENTION

1. Field of the Invention

The present invention relates to an apparatus for protecting impact to a rack bar of a power steering gearbox, and more particularly an apparatus for protecting impact to a rack bar of a power steering gear box, in which impact and noise are not generated by releasing a part of oil pressure immediately before a piston of the rack bar moving by the power of oil pressure reaches a rack bush.

2. Description of the Related Art

In general, an automobile is provided with a power steering device for light and rapid steering operation, which comprises an oil pump to generate oil pressure, a power source, by driving an engine of the automobile, a control valve to control oil supplied from the oil pump by opening and closing a oil pathway according to operation of a steering wheel, and a gearbox to generate a steering power by the oil pressure transmitted through the control valve.

FIG. 1 is a front view of a gearbox and a control valve of a conventional power steering device. This prior art will be explained with reference to Korean Laid-Open Utility Model Publication No. 2000-0016760 and Korean Laid-Open Patent Publication No. 2001-0027557.

As shown in FIG. 1, a gearbox 20 elongated from side to side to be connected with a wheel is provided at the center with a control valve 10 which is installed to cross the axis of the gearbox 20. Also, the control valve 10 is connected with the gearbox 20 by oil pressure tubes 40.

The control valve has a valve housing 11 to define the outward appearance. The valve housing is provided with oil ports 12, through which oil flows, on the outside thereof and an input axis 13 at the center thereof.

Inside the input axis 13 installed within the valve housing 11, a rotary valve, though it is not shown, is disposed to supply oil pressure to the inside of the gearbox 20 by controlling the oil pathway. By this rotary valve, the gearbox 20 generates assistant servo by oil pressure to achieve power steering.

At the lower part of the control valve 10, the gearbox is disposed to generate a steering power by moving a tie rod 25 extending from side to side by oil pressure supplied to the control valve 10. The gearbox has a shape of an elongated cylinder 26 with both sides opened. The cylinder 26 is provided at the inside of one end with a nut part 29 having screw threads so that a rack bush 50 can be installed. Also, the cylinder 26 is provided with a rod-shaped rack bar 21, which extends while passing through both ends of the cylinder 26 and can slide toward both ends of the cylinder 26. The rack bar 21 is joined to the tie road which is connected at its both sides extending out of the cylinder 26 with the wheel side and thus, it is possible to directly manipulate wheels. On the outer circumference of the cylinder, a left port 23 and right port 24 are provided to be connected with the inside of the cylinder so that the oil through the control valve 10 can be supplied to the inside of the cylinder 26.

On the outer surface of the rack bar 21 which is located within the cylinder 26, a disc-shaped piston 27 is provided, which separates the inner space of the cylinder 26 and the rack bar 21 can operate by the oil pressure transmitted through the piston.

The cylinder 26 is provided with oil seals 30 inside the open ends to prevent oil leakage. The outer circumference of the oil seals 30 are fixed at the inner surface of the cylinder 26 and the inner circumference contacts with the rack bar 21 in a way that the rack bar 21 can slide. Also, the rack bar 21 is provided on the outer surface of its one side with rack gears (not shown) extending from side to side and the input axis 13 is provided with pinion gears (not shown) which engage with the rack gears to directly transmit rotation power to the rack gears, whereby the rack gears can move from right to left.

Meanwhile, the cylinder 26 is provided at its one end with a rack bush 50 which guides the movement from side to side of rack bar 21 and prevents noise generated inside the cylinder 26 and oil leakage. The rack bush 50 is a cylindrical hollow bar having a hollow part 54, through which the rack bar 21 can slide.

Outside the hollow part 54, there are an insert part 52 which is inserted in the cylinder 26, a flange part 51 having a diameter greater than that of the input part which is disposed toward the open end of the cylinder 26 to close the end of the cylinder, and a bolt part 53 having screw threads which is disposed on the outer circumference of the insert part next to the flange part 51. The bolt part 53 is fastened to the nut part 29 formed at one end of the cylinder 26 to join the rack bush 50 with the cylinder 26.

Thus, in case of the conventional power steering apparatus constructed as described above, oil supplied from the oil pump to the cylinder circulates while a driver does not manipulate the steering wheel. When the driver manipulates the steering wheel the pinion gears rotate and thereby rack gears engaged with the pinion gears move in a predetermined direction. At the same time, the rotary valve disposed in the input axis 13 controls an oil pathway, whereby oil is supplied to the cylinder 26 so that the rack bar 21 can move to the direction along which the steering wheel rotates. In this way, the piston 27 slides and the driver can readily turn the steering wheel. At this time, the rack bar 21 slides from the left side to the right side within the cylinder 26 and rack bush 30 is disposed at one side inside the cylinder 26 to guide such movement of the rack bar 21.

However, such conventional apparatus has problem in that when the piston 27 moves to either right or left end by the action of oil pressure and touches the rack bush 50 located at the end, impact and thereby noise can be generated, since the oil pressure is too great, causing damage to stability.

SUMMARY OF THE INVENTION

To solve the above-indicated problems, it is, therefore, an object of the present invention to provide a rack bar of a power steering gearbox with reduced impact and noise in a cylinder, in which a first rack bush and a second rack bush are disposed adjacent to each other, a first rotary valve and the second rotary valve are disposed in the front and a bypass hole with a downward convex shape is formed, whereby a part of oil pressure is released immediately before a piston of the rack bar moving by the power of oil pressure reaches a rack bush.

To achieve the above object, there is provided an apparatus for protecting impact to a rack bar of a power steering gearbox comprising an oil pressure cylinder, to which oil which has passed through an oil pressure pump and a rotary valve is supplied through a left port or right port, a rack bar disposed in the oil pressure cylinder and horizontally reciprocating therein, a piston fixed at the middle of the rack bar, a first rack bush and a second rack bush disposed at both ends of the cylinder, in which the piston moves, to close the cylinder, and bypass holes with a downward convex shape disposed at both ends of the cylinder adjacent to the first and second rack bushes.

BRIEF DESCRIPTION OF THE DRAWINGS

The above objects, features and advantages of the present invention will become more apparent from the following detailed description when taken in conjunction with the accompanying drawings, in which:

FIG. 1 is a cross-sectional view of a conventional power steering gearbox;

FIG. 2 is a cross-sectional view of the power steering gearbox according to the present invention;

FIG. 3 is an enlarged cross-sectional view of the apparatus for protecting impact to a rack bar according to the present invention; and FIG. 4 is a cross-sectional view taken along the line A-A of FIG. 3.

DETAILED DESCRIPTION OF THE PREFERRED EMBODIMENT

The construction of the present invention will now be described with reference to the accompanying drawings.

FIG. 2 is a cross-sectional view of the apparatus for preventing impact to a rack bar in a power steering gearbox according to the present invention, FIG. 3 is an enlarged cross-sectional view of the apparatus for protecting impact to a rack bar shown in FIG. 2 and FIG. 4 is a side cross-sectional view of a cylinder with a bypass hole formed.

The construction and operation of the power steering gearbox are the same with the prior art. Thus, explanation of those will make reference to those described above for the conventional one and only the construction and operation according to the present invention different from the prior art will be described.

For reference, in the following description, same drawing reference numerals are used for the same elements of the power steering gearboxes according to the present invention and the prior art.

Now, the present invention will be explained with reference to FIG. 3 and FIG. 4.

Bypass holes 60 are formed at both sides of an oil pressure cylinder 26 adjacent to a first rack bush 50 and a second rack bush 50'. The bypass holes 60 are convex from the inside to the outside.

Though it is shown in the figures that that the bypass holes are formed at the lower part, they may be formed at the upper part or the right or left side parts.

Meanwhile, the oil pressure transmitted from a valve housing 11 is supplied to the right or left side of a rotary valve 12 by the operation of a driver.

The oil, a flow direction of which is determined by the rotary valve is transported to a left port 23 or a right port 24 of the cylinder via an oil pressure tube 40.

The oil pressure within the oil pressure cylinder 26 is transmitted to a rack bar 21 and a piston 27 disposed on the rack bar 21 so as to laterally apply a force.

The piston 27 moves to the left side or the right side of the rack bar 21, whereby tie rods 25 mounted on both ends of the rack bar 21 move and pivot.

When a driver turns a steering wheel to the end, the piston 27 within the oil pressure cylinder 26 moves to the end by the oil pressure.

The piston 27 collides with the rack bushes 50, 50' formed at both ends of the oil pressure cylinder 26 to stop the rack bar 21.

At this time, as the oil pressure is supplied through the right port 24 of the rotary valve to the cylinder 26, the rack bar 21 moves to the left side but the oil pressure is continuously transmitted.

However, once the piston 27 fixed on the rack bar 21 passes the bypass holes 60, a part of the oil pressure is transmitted to the left side of the cylinder and thus, the entire oil pressure is weakened. The oil pressure transmitted to the left side provides damping effect.

Thus, when the piston 27 passes the bypass holes 60, the oil pressure is weakened.

By the operation as described above, impact or noise generated by the collision of the piston 27 with the rack bushes 50, 50', which frequently occurs by a full turn of a wheel when parking a car or driving a car on a side street, can be reduced and the effect of the present invention can be obtained without changing the conventional basic structure.

As described above, the apparatus for protecting impact to a rack bar of a power steering gearbox according to the present invention has the following effects.

By the bypass holes formed at the lower part in the oil pressure cylinder, a part of oil pressure is released immediately before a piston of the rack bar moving by the power of oil pressure reaches a rack bush and thus, impact to the cylinder or noise is not generated.

Since a part of oil pressure applied to the bypass holes when the piston passes the bypass holes is transmitted to the other side of the cylinder through the bypass holes, the oil pressure is reduced after the piston progresses beyond that and thereby, the oil of the power steering itself can absorb impact and shock. Therefore, it is possible to obtain damping effect without any additional device.

What is claimed is:

1. An apparatus for protecting impact to a rack bar of a power steering gearbox, the apparatus comprising:

an oil pressure cylinder, to which oil has passed through an oil pressure pump and a rotary valve is supplied through a left port or right port;

a rack bar in the oil pressure cylinder and horizontally reciprocating therein;

a piston secured to the rack bar;

a first rack bush and a second rack bush positioned at both ends of the cylinder, in which the piston moves, to close the cylinder; and bypass holes comprising depressions formed in the walls of the cylinder with an outward convex shape, each bypass hole being substantially greater in size than an entire axial width of the piston such that fluid flows around the piston when the piston is positioned at one of the bypass holes, the bypass holes being disposed at both ends of the cylinder adjacent to the first and second rack bushes and all the bypass holes being separate and distinct from the left and the right ports, wherein the piston has a uniform outer periphery throughout its axial length, each bypass hole is substantially greater in length than the entire axial length of the piston, and wherein the cylinder protrudes outwardly thereof at a position corresponding to the bypass hole.

2. The apparatus according to claim 1, wherein the depressions have a limited extent in the circumferential direction.

3. The apparatus according to claim 1, wherein the bypass holes are aligned along a length direction of the cylinder.

4. The apparatus according to claim 1, wherein each bypass hole is spaced from an end point of a piston's travel by more than an axial width of the piston.

5. An apparatus for protecting a rack bar, the apparatus comprising:
 a housing;
 a first port directing fluid to and from the housing;
 a second port directing fluid to and from the housing;
 a rack bar movably positioned in the housing;
 a piston secured to the rack bar; and
 bypass holes comprising outwardly convex shaped depressions in the walls of the housing, each bypass hole being substantially greater in size than an entire axial width of the piston such that fluid flows around the piston when the piston is positioned at one of the bypass holes, all the depressions being spaced from and distinct from the first port and the second port of the housing,
 wherein the piston has a uniform outer periphery throughout its axial length, each bypass hole is substantially greater in length than the entire axial length of the piston, and the cylinder protrudes outwardly thereof at a position corresponding to the bypass hole.

6. The apparatus according to claim 5, wherein the depressions have a limited extent in the circumferential direction.

7. The apparatus of claim 5, wherein the bypass holes are aligned along a length direction of the cylinder.

8. The apparatus according to claim 5, further comprising a plurality of rack bushes positioned in the housing so as to guide movement of the piston.

9. The apparatus according to claim 5, wherein at least one of the bypass holes is adjacent to and spaced from the first rack bush and at least another of the bypass holes is adjacent to and spaced from the second rack bush.

10. The apparatus according to claim 5, further comprising a rotary valve that controls a direction of fluid flow of the cylinder by transmitting fluid to one of a left port and a right port.

11. The apparatus according to claim 5, wherein each bypass hole is spaced from an end point of a piston's travel by more than an axial width of the piston.

* * * * *